US010851672B2

(12) United States Patent
Jakomin et al.

(10) Patent No.: US 10,851,672 B2
(45) Date of Patent: Dec. 1, 2020

(54) GROMMET FOR A TURBINE ENGINE

(71) Applicant: General Electric Company, Schenectady, NY (US)

(72) Inventors: John Martin Jakomin, Sharonville, OH (US); Darrell Glenn Senile, Oxford, OH (US)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 16/120,952

(22) Filed: Sep. 4, 2018

(65) Prior Publication Data
US 2020/0072082 A1    Mar. 5, 2020

(51) Int. Cl.
*H02G 3/22*    (2006.01)
*F01D 25/24*    (2006.01)
*F16B 5/02*    (2006.01)

(52) U.S. Cl.
CPC .......... *F01D 25/243* (2013.01); *F16B 5/0258* (2013.01); *F05D 2260/31* (2013.01); *F05D 2300/6033* (2013.01)

(58) Field of Classification Search
CPC ... Y10T 16/05; Y10T 16/063; B60R 16/0222; B60R 16/0207; B60R 16/0215; H02G 3/22; H02G 3/0468; H02G 3/0481; H02G 15/013; F16L 5/00; F16L 5/10; F16B 5/0258; F16B 43/001; F16B 13/04; F16B 13/025; H01R 13/5205; H01R 16/5208;
(Continued)

(56) References Cited

U.S. PATENT DOCUMENTS 3,227,001 A    1/1966 Reese
3,244,056 A  * 4/1966 Kern ....................... F16B 37/00
                                                411/340
(Continued)

FOREIGN PATENT DOCUMENTS

DE    102006052213 A1    5/2008
EP        3178801 A1   12/2013
(Continued)

OTHER PUBLICATIONS

European Search Report Corresponding to Application No. 19184546 dated Apr. 1, 2020.
(Continued)

*Primary Examiner* — Chuck Y Mah
(74) *Attorney, Agent, or Firm* — Dority & Manning, P.A.

(57) ABSTRACT

A grommet assembly for mounting to a component of a turbine engine is provided. In one exemplary aspect, the grommet assembly includes a grommet that is removably mounted within a pass-through opening defined by the component. The component may be formed of a composite material. A locking member may be mounted to a body of the grommet. A flange projects from the body. When the grommet is mounted to the component and the locking member is mounted to the body, the body is received by the pass-through opening of the component and the locking member is mounted to the body such that the locking member and the flange clamp the component to secure the grommet to the component. An interface member, such as a pin, may be received by a hole defined by the grommet.

20 Claims, 6 Drawing Sheets

(58) Field of Classification Search
CPC .............. F01D 25/243; F05D 2260/31; F05D 2300/6033
See application file for complete search history.

(56) References Cited

U.S. PATENT DOCUMENTS

| | | | |
|---|---|---|---|
| 4,841,817 A * | 6/1989 | Tsui | B23B 49/02 408/61 |
| 5,255,647 A | 10/1993 | Kiczek | |
| 5,340,258 A * | 8/1994 | Simon | F16B 35/005 411/339 |
| 5,410,102 A * | 4/1995 | Guiol | H01R 4/646 174/142 |
| 5,722,339 A * | 3/1998 | Gross | B63B 13/02 114/182 |
| 5,765,819 A * | 6/1998 | Hummel | F16F 1/3732 267/141.2 |
| 6,164,231 A * | 12/2000 | Shimmell | B63B 13/02 114/182 |
| 6,374,455 B1 * | 4/2002 | Regele | F16L 5/10 16/2.1 |
| 6,485,241 B1 * | 11/2002 | Oxford | B60R 11/0217 16/2.1 |
| 7,086,412 B2 | 8/2006 | Uleski | |
| 7,207,361 B1 * | 4/2007 | Vice | B27C 5/10 144/136.95 |
| 7,237,389 B2 | 7/2007 | Ryan et al. | |
| 7,681,923 B2 | 3/2010 | Negley et al. | |
| 7,895,709 B2 | 3/2011 | Shishikura | |
| 8,096,017 B2 * | 1/2012 | Van Walraven | F16L 5/00 16/2.1 |
| 8,146,951 B2 * | 4/2012 | Tung | B63J 4/006 114/182 |
| 8,454,290 B2 * | 6/2013 | Schaser | F16B 5/0258 411/544 |
| 9,109,448 B2 | 8/2015 | Ivakitch et al. | |
| 9,385,520 B1 * | 7/2016 | Gretz | H02G 15/013 |
| 9,704,620 B2 * | 7/2017 | Martins Neto | H02G 15/013 |
| 9,790,974 B2 | 10/2017 | Holt et al. | |
| 10,263,361 B1 * | 4/2019 | Gretz | H01R 13/59 |
| 10,316,695 B2 | 6/2019 | Renggli | |
| 2002/0003993 A1 | 1/2002 | Ichimaru | |
| 2006/0231586 A1 | 10/2006 | Blanchard et al. | |
| 2012/0171023 A1 | 7/2012 | Albers et al. | |
| 2012/0317789 A1 * | 12/2012 | Moon | F16B 37/125 29/525.11 |
| 2013/0251446 A1 | 9/2013 | Bird et al. | |
| 2014/0301802 A1 * | 10/2014 | Kozak | F16B 19/02 411/55 |
| 2014/0321941 A1 | 10/2014 | Hufenbach et al. | |
| 2016/0180988 A1 * | 6/2016 | Klein | B64C 1/00 174/153 G |
| 2017/0205001 A1 * | 7/2017 | Logan | F16L 5/08 |
| 2018/0051880 A1 | 2/2018 | Stieg et al. | |

FOREIGN PATENT DOCUMENTS

| | | |
|---|---|---|
| JP | H0374127 A | 3/1991 |
| JP | 2009/063170 A | 3/2009 |
| JP | 2017/163821 A | 9/2017 |
| WO | WO2013/192558 A1 | 12/2013 |

OTHER PUBLICATIONS

Machine Translated Japanese Search Report Corresponding to Application No. 2019124490 dated Aug. 19, 2020.
Machine Translated Japanese Office Action Corresponding to Application No. 2019124490 dated Sep. 2, 2020.

* cited by examiner

GROMMET FOR A TURBINE ENGINE

FEDERALLY SPONSORED RESEARCH

This invention was made with government support under contract number FA8626-16-C-2138. The U.S. government may have certain rights in the invention.

FIELD

The present subject matter relates generally to gas turbine engines, and more particularly to grommets for composite/metallic interfaces of gas turbine engines.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used for various components within gas turbine engines. Given the ability of CMC materials to withstand relatively extreme temperatures, there is particular interest in replacing components within the combustion and turbine sections of the gas turbine engine with CMC materials. For instance, inner and outer combustor liners, shrouds, nozzle segments, etc. of gas turbine engines are more commonly being formed of CMC materials.

Some CMC components are mechanically fastened to structural components, e.g., a casing, by means of a pass-through opening or hole through the CMC component and a metallic pin that transfers loads to the structural components of the engine. In some instances, metallic pins are inserted directly into the pass-through opening of the CMC component. This presents a number of challenges, including delamination of the plies of the CMC component due to sliding of the metallic pin within the pass-through opening, and in addition, the CMC component and the metallic pin thermally expand at different rates, which cause non-uniform wear of the CMC component, among other issues. In some instances, a metallic grommet is inserted into the pass-through opening of the CMC component such that the metallic pin or pass-through member may contact and rotate within the more compliant and compatible metallic grommet. Such metallic grommets are typically swaged into the pass-through opening or are permanently fastened to the CMC component. Thus, machine tools must be used to weld or braze the grommet into place. When the grommet is swaged into position, the grommet becomes permanently deformed. To remove the grommet, e.g., after excessive wear, the machine tools are required once again to remove the grommet. During removal, the plies of the CMC component may become damaged. Consequently, installing and removing grommets requires welding and/or brazing tools and may lead to damage of the CMC component.

Accordingly, a grommet assembly that addresses one or more of the challenges noted above would be useful.

BRIEF DESCRIPTION

Aspects and advantages of the invention will be set forth in part in the following description, or may be obvious from the description, or may be learned through practice of the invention.

In one exemplary embodiment of the present disclosure, a grommet assembly is provided. The grommet assembly includes a grommet removably mounted to a component defining a pass-through opening, the grommet having a body extending between a first end and a second end and defining a hole, a flange projecting from the body at or proximate the first end and extending circumferentially around at least a portion of the hole. Further, the grommet includes a locking member removably mounted to the body. Moreover, when the grommet is mounted to the component and the locking member is mounted to the body, the body of the grommet is received within the pass-through opening of the component and the locking member is mounted to the body such that the locking member and the flange clamp the grommet to the component.

In some embodiments, the body has an interface portion having a smooth outer surface and a threaded portion extending between the second end and the interface portion, wherein when the grommet is mounted to the component, the interface portion of the body is received within the pass-through opening of the component.

In some further embodiments, when the locking member is mounted to the body, the locking member is threaded onto the threaded portion.

In some embodiments, the locking member has a secondary retention feature, wherein when the locking member is mounted to the body, the secondary retention feature is crimped onto the body.

In some embodiments, the grommet assembly further includes a compliant member removably mounted to the body, wherein the body has an outer surface and an inner surface, and wherein when the compliant member is mounted to the body, the compliant member is disposed around at least a portion of the outer surface of the body between the locking member and the component.

In some further embodiments, the compliant member is at least one of a bushing, a spring, and a damper.

In yet other embodiments, the component has a first surface and a second surface spaced from the first surface, and wherein the pass-through opening extends between the first surface and the second surface, and wherein when the grommet and the compliant member are mounted to the body, the compliant member is disposed between the locking member and the second surface of the component and the flange contacts the first surface of the component.

In some embodiments, the flange extends circumferentially around the hole. That is, in some embodiments, the flange extends annularly around the hole.

In some embodiments, the flange extends circumferentially less than three hundred sixty degrees around the hole.

In some embodiments, the flange has a first flange portion extending circumferentially less than three hundred sixty degrees around the hole and a second flange portion extending circumferentially less than three hundred sixty degrees around the hole and spaced from the first flange portion.

In some embodiments, the hole of the body is configured to receive an interface member.

In some embodiments, the grommet is formed of a metallic material.

In some embodiments, the component is formed of a composite material.

In some embodiments, the composite material is a ceramic matrix composite (CMC) material.

In another exemplary aspect of the present disclosure, an interface assembly is provided. The interface assembly includes a component having a first surface and a second surface spaced from the first surface, the component defining a pass-through opening extending between the first surface and the second surface. The interface assembly also includes a grommet assembly. The grommet assembly includes a grommet having a body extending between a first end and a second end and defining a hole for receiving an interface member, the body having an interface portion and a threaded portion, the grommet further having a flange projecting from the interface portion of the body at or proximate the first end, the flange extending circumferentially around at least a portion of the hole. The grommet assembly also includes a locking member removably mounted to the threaded portion of the body.

In some embodiments, when the interface portion of the body is received within the pass-through opening of the component and the locking member is threaded onto the threaded portion of the body, the locking member and the flange clamp the grommet to the component.

In some embodiments, the flange extends circumferentially less than or equal to two thirds around the hole.

In some embodiments, the interface assembly includes a compliant member removably mounted to the interface portion of the body, wherein when the compliant member is mounted to the interface portion of the body, the compliant member extends circumferentially around at least a portion of the interface portion and is disposed between the locking member and the second surface of the component.

In some embodiments, the locking member has a secondary retention feature, wherein when the locking member is threaded onto the threaded portion of the body, the secondary retention feature is crimped onto the threaded portion.

In yet another exemplary aspect of the present disclosure, an interface assembly is provided. The interface assembly includes a component formed of a ceramic matrix composite (CMC) material and having a first surface and a second surface spaced from the first surface, the component defining a pass-through opening extending between the first surface and the second surface. The interface assembly also includes an interface member formed of a metallic material. Further, the interface assembly includes a grommet assembly. The grommet assembly includes a grommet formed of a metallic material and having a body extending between a first end and a second end, the body having an interface portion defining a hole for receiving the interface member, the body also having a threaded portion extending from the second end to the interface portion, the grommet further having a flange projecting radially from the interface portion of the body at or proximate the first end, the flange extending circumferentially around at least a portion of the hole. Moreover, the grommet assembly includes a locking member removably mounted to the threaded portion of the body. When the interface portion of the body is received within the pass-through opening of the component and the locking member is threaded onto the threaded portion of the body, the locking member and the flange clamp the grommet to the component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
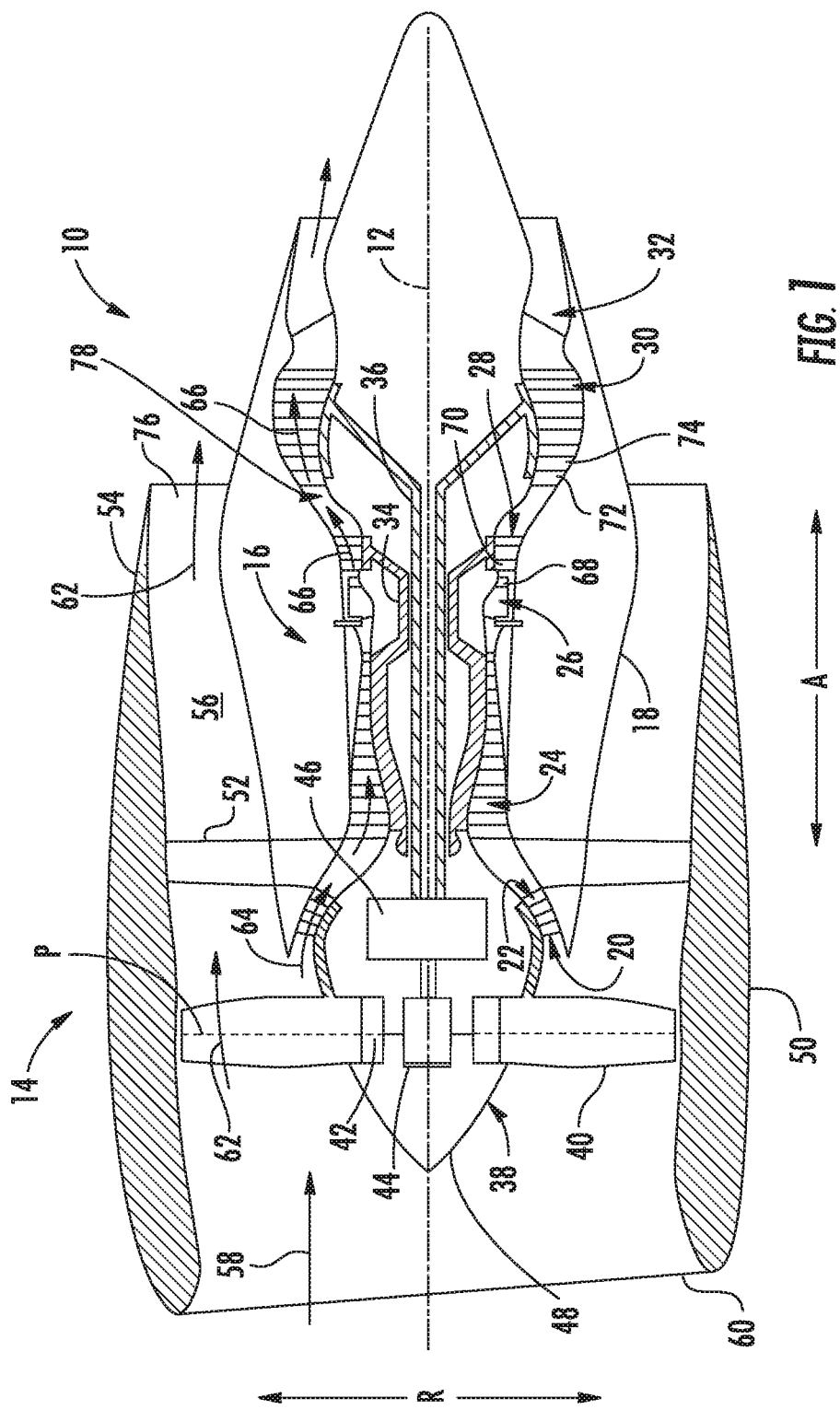
FIG. 1 provides a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. It should be appreciated, that as used herein, terms of approximation, such as "about" and "approximately," refer to being within a ten percent (10%) margin of error.

Exemplary aspects of the present disclosure are directed to a grommet assembly for mounting to a component of a turbine engine is provided. In one exemplary aspect, the grommet assembly includes a grommet that is removably mounted within a pass-through opening defined by the component. The component may be formed of a composite material, such as e.g., a plurality of CMC plies. A locking member may be mounted to a body of the grommet. The locking member may be a locking nut or a nut, for example.

A flange projects from the body. When the grommet is mounted to the component and the locking member is mounted to the body, the body is received by the pass-through opening of the component and the locking member is mounted to the body such that the locking member and the flange clamp the component. In this way, the grommet is secured to the component. An interface member, such as a pin, may be received by a hole defined by the grommet. An exemplary interface assembly is also provided.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan 10." As shown in FIG. 1, the turbofan 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable spinner or front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only, and that in other exemplary embodiments, the turbofan 10 may have any suitable configuration. For example, the present disclosure matter may be suitable for use with or in turboprops, turboshafts, turbojets, reverse-flow engines, industrial and marine gas turbine engines, and/or auxiliary power units.

In some instances, one more components of the turbofan 10 may be composite components, such as e.g., Ceramic Matrix Composite (CMC) components. For instance, shrouds, nozzle segments, combustor liners, etc. may all be formed of a CMC material, which is a non-metallic material having high temperature capability. Exemplary CMC materials utilized for such components may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about $1.3 \times 10^{-6}$ in/in/° F. to about $3.5 \times 10^{-6}$ in/in/° F. in a temperature of approximately 1000-1200° F.

Some CMC components may be mechanically fastened into the turbine section or the combustion section 26 by means of a pass-through opening defined through the CMC component and a metallic pin that transfers loads to the remainder of the turbofan 10. For instance, the metallic pin may be formed of a metal, such as a nickel-based superalloy (having a coefficient of thermal expansion of about 8.3-8.5× $10^{-6}$ in/in/° F. in a temperature of approximately 1000-1200° F.) or cobalt-based superalloy (having a coefficient of thermal expansion of about 7.8-8.1×$10^{-6}$ in/in/° F. in a temperature of approximately 1000-1200° F.). CMC components are regularly distressed at or proximate the pass-through opening near where the metallic pin interfaces with the CMC component. This distress is caused at least in part by the relative motion or sliding of the pin within the hole. With the sliding motion, there is a risk of delamination between the plies of the CMC component. Further, the high friction coefficient between the CMC component and the metallic pin can cause undesirable forces at the pin joint, which may result in unexpected system reactions. Accordingly, in some instances, it is desirable to position a grommet, particularly a metallic grommet, within the pass-through opening of the CMC component such that the metallic pin interfaces with the metallic grommet instead of the CMC component. An exemplary grommet assembly that creates a metallic bearing surface for a metallic pin and that is removable and replaceable at a piece part level is described below. The exemplary grommet may also be utilized near interrupted surfaces, such as e.g., chordal seals.

Figure 2:
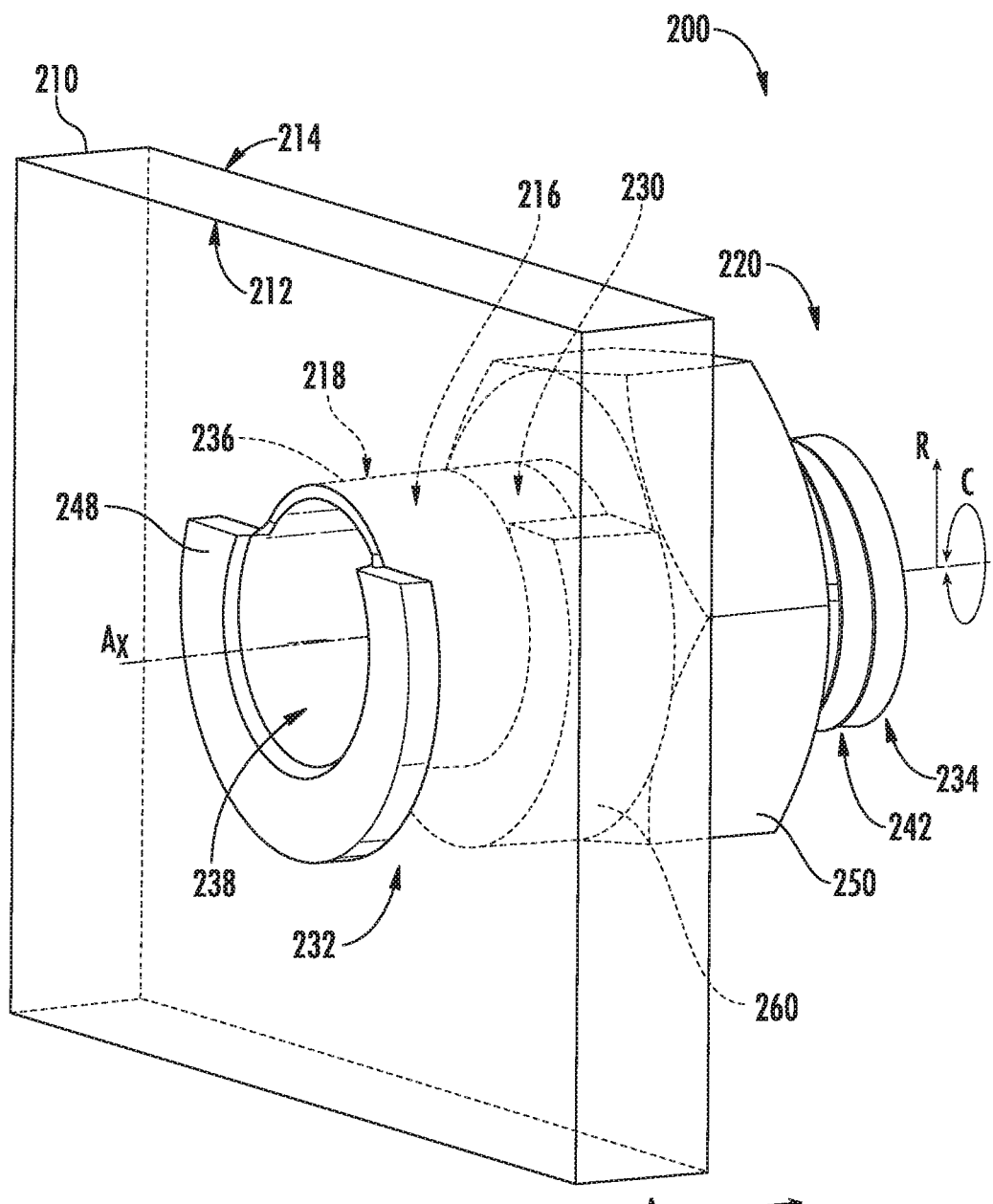
FIG. 2 provides a perspective view of an exemplary interface assembly in accordance with an exemplary embodiment of the present disclosure.
Figure 3:
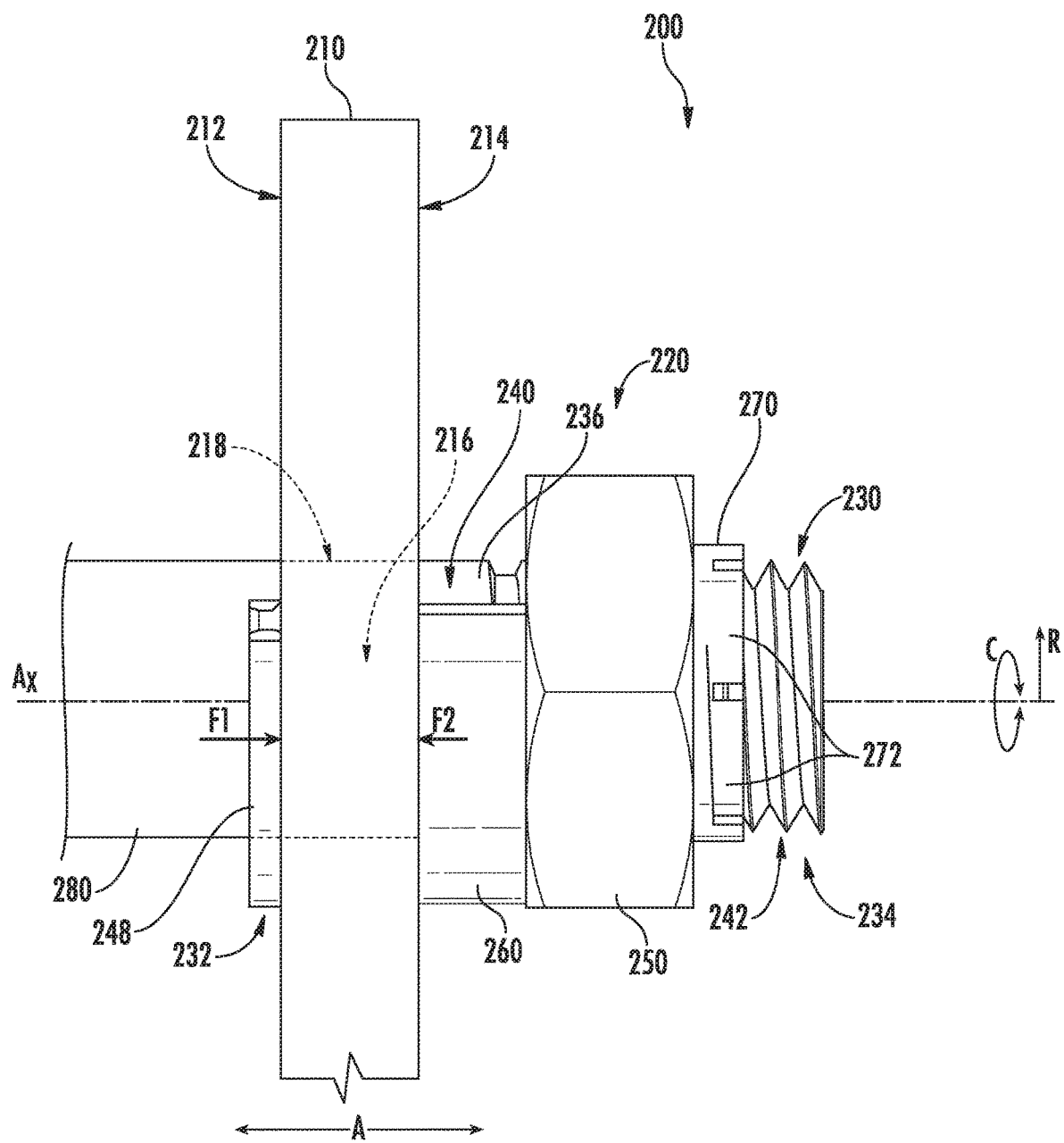
FIG. 3 provides a side, perspective view of the exemplary interface assembly of FIG. 2.
Figure 4:
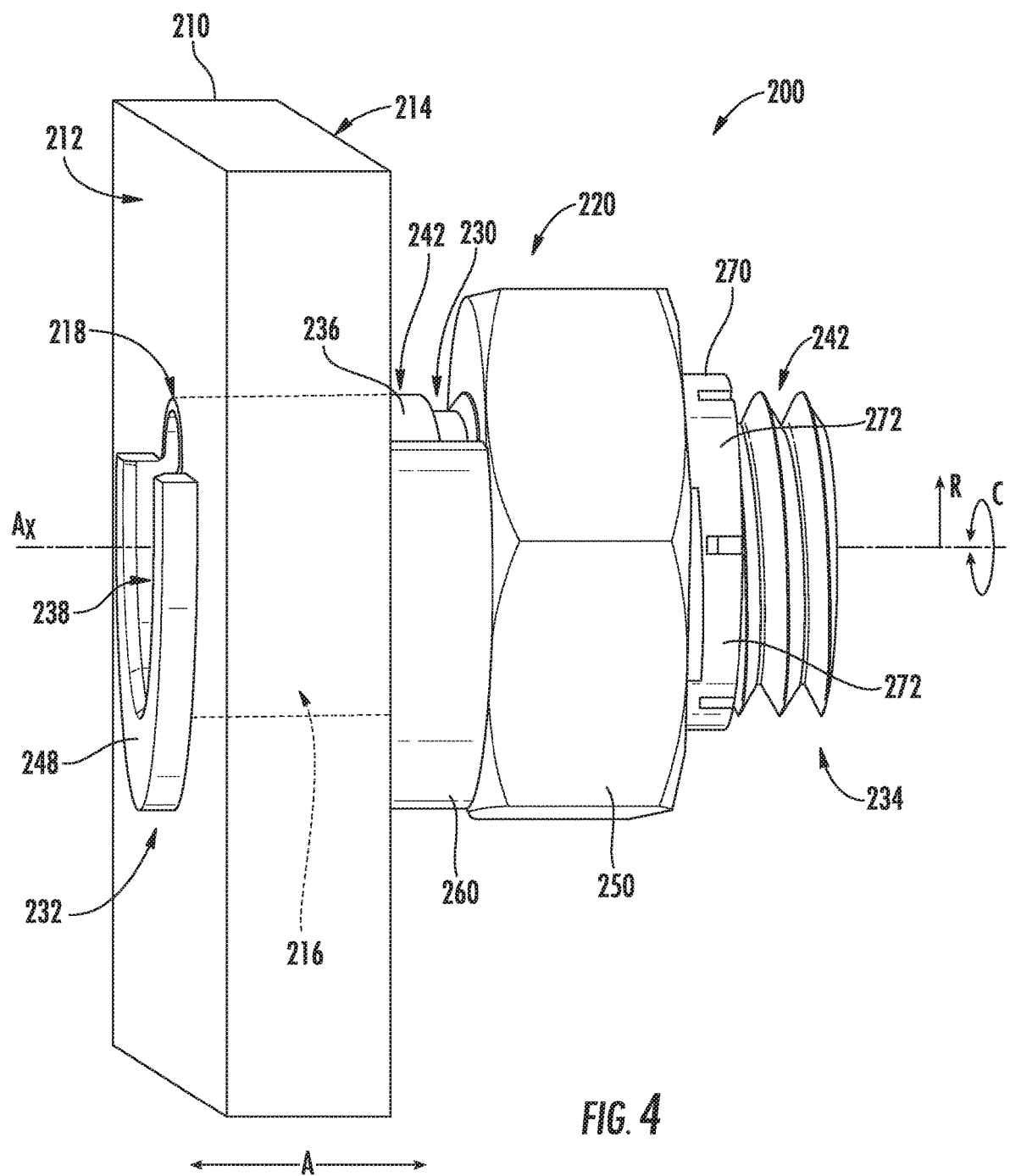
FIG. 4 provides a side view of the exemplary interface assembly of FIG. 2.

FIGS. 2, 3, and 4 provide various views of an exemplary interface assembly 200 in accordance with an exemplary embodiment of the present disclosure. In particular, FIG. 2 provides a perspective view of the interface assembly 200. In FIG. 2, a component 210 of the interface assembly 200 is shown transparent for illustrative purposes. FIG. 3 provides a side, perspective view of the exemplary interface assembly 200. FIG. 4 provides a side view of the exemplary interface assembly 200. For reference, the interface assembly 200 defines an axial direction A, a radial direction R, and a circumferential direction C. Moreover, the interface assembly 200 defines an axial centerline AX that extends along the axial direction A. The interface assembly 200 is concentrically aligned with the axial centerline AX. In general, the axial direction A extends parallel to the axial centerline AX, the radial direction R extends orthogonally to and from the axial centerline AX, and the circumferential direction C extends three hundred sixty degrees (360°) around the axial centerline AX.

The interface assembly 200 includes component 210. For instance, the component 210 may be a combustor liner, a shroud, a band of a nozzle segment, etc. The component 210 may be other suitable components as well. The component 210 has a first surface 212 and a second surface 214 spaced from the first surface 212, e.g., along the axial direction A. The first and second surfaces 212, 214 are generally parallel to one another and both extend in planes orthogonal to the axial direction A. However, the first and second surfaces 212, 214 need not extend parallel to one another and need not both extend in planes orthogonal to the axial direction A. Moreover, the component 210 defines a pass-through opening 216 extending through or between the first surface 212 and the second surface 214. For this embodiment, the pass-through opening 216 has a generally circular axial cross-section, however in other exemplary embodiments, the pass-through opening 216 may have any suitable axial cross section. An interior surface 218 of the component 210 may define the pass-through opening 216.

For this exemplary embodiment, the component 210 is formed of a composite material. As one example, the composite material of the component 210 may be a CMC material, e.g., such as one of the CMC materials noted above. That is, the component 210 may be formed of a plurality of CMC plies. As another example, the composite material of the component 210 may be a polymer matrix composite (PMC) material. Other suitable composite materials are contemplated. In alternative exemplary embodiments, the component 210 may be formed of other suitable materials, such as, e.g., metal or a polymer material.

The interface assembly 200 also includes a grommet assembly 220. The grommet assembly 220 includes a grommet 230 (shown best in FIG. 5) removably mounted or mountable to the component 210. More particularly, when mounted, the grommet 230 is received by the pass-through opening 216 of the component 210, as will be explained in greater detail below. The grommet assembly 220 also includes a locking member 250 removably mounted or mountable to the grommet 230. As best shown in FIGS. 3 and 4, the locking member 250 may include a secondary retention feature 270. In addition, for this embodiment, the grommet assembly 220 also includes a compliant member 260. Generally, the grommet 230 extends between a first end 232 and a second end 234, e.g., along the axial direction A. The grommet 230 is formed of a metallic material in this embodiment, but in alternative embodiments, may be formed of another suitable material.

Figure 5:
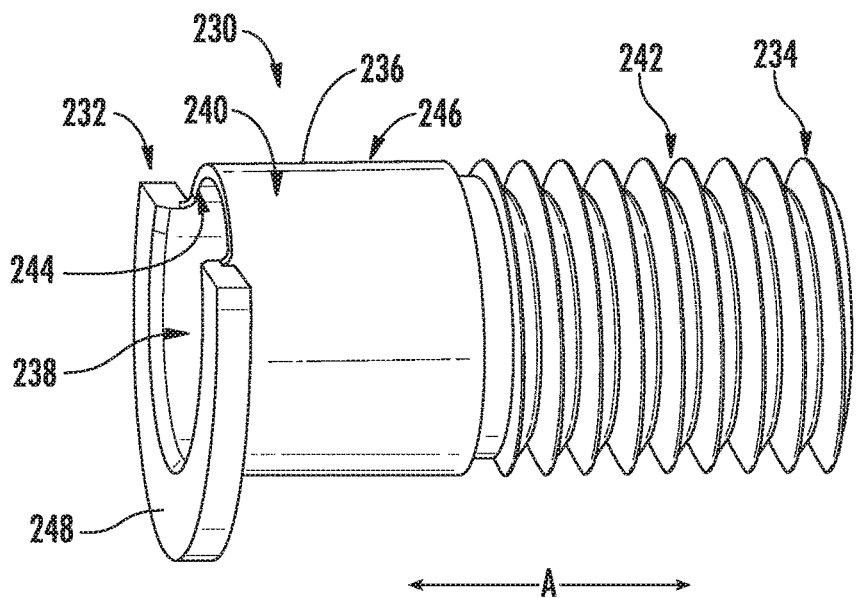
FIG. 5 provides a perspective view of an exemplary grommet of the grommet assembly of FIG. 2.

FIG. 5 provides a perspective view of the grommet 230 in accordance with one exemplary embodiment of the present disclosure. As shown, the grommet 230 includes a body 236. The body 236 has an interface portion 240 and a threaded portion 242. The threaded portion 242 extends from the second end 234 to the interface portion 240, e.g., along the axial direction A. As depicted, the threaded portion 242 includes a thread for receiving a threaded component having a complementary thread. For instance, the threaded component may be the locking member 250 of the grommet assembly 220.

The interface portion 240 extends from the threaded portion 242 to the second end 234 of the grommet 230. The interface portion 240 of the body 236 has an inner surface 244 and an outer surface 246 spaced from the inner surface 244, e.g., along the radial direction R. The inner and outer surfaces 244, 246 are smooth surfaces in this embodiment. Notably, the interface portion 240 of the body 236 defines a hole 238. More particularly, the inner surface 244 of the interface portion 240 defines the hole 238. Accordingly, the interface portion 240 of the body 236 is generally hollow. For this embodiment, the hole 238 extends between the first end 232 and the threaded portion 242 of the body 236. Thus, the hole 238 depicted in FIG. 5 is a blind hole (i.e., the hole 238 does not pass through the grommet 230). However, in alternative embodiments, the hole 238 may extend between the first end 232 and the second end 234 of the grommet 230, e.g., the full axial length of the grommet 230.

As shown best in FIG. 3, the hole 238 (FIG. 2) defined by the body 236 of the grommet 230 is configured to receive an interface member 280. For instance, in some embodiments, the interface member 280 is a metallic pin. In some embodiments, the material of the inner surface 244, or the grommet 230 more generally, may be selected to facilitate desired interface properties. For instance, the material of the inner surface 244 may be selected to facilitate temperature compatibility with the interface member 280. Moreover, the material of the inner surface 244 or grommet 230 may be selected to facilitate advantageous friction coefficients and contact compliance with the interface member 280. Further, in embodiments in which the inner surface 144 and interface member 280 are formed of a metallic material, a lubricious wear surface between the inner surface 144 and interface member 280 may be achieved. Additionally, where the component 210 is a composite component formed of a plurality of plies, the plies of the component 210 are protected and delamination of the plies near or proximate the pass-through opening 216 are minimized and/or prevented.

Notably, the outer surface 246 of the interface portion 240 is sized and shaped complementary to the shape and size of the pass-through opening 216 of the component 210. When the grommet 230 is mounted to the component 210, the interface portion 240 of the body 236 is received within the pass-through opening 216 of the component 210. More particularly, the interface portion 240 is received within the pass-through opening 216 and the outer surface 246 of the interface portion 240 contacts the interior surface 218 of the component 210 that defines the pass-through opening 216. Thus, the outer surface 246 of the interface portion 240 and the interior surface 218 of the component 210 are closely coupled, and thus, large relative motion between the component 210 and the grommet 230 is prevented.

Figure 6:
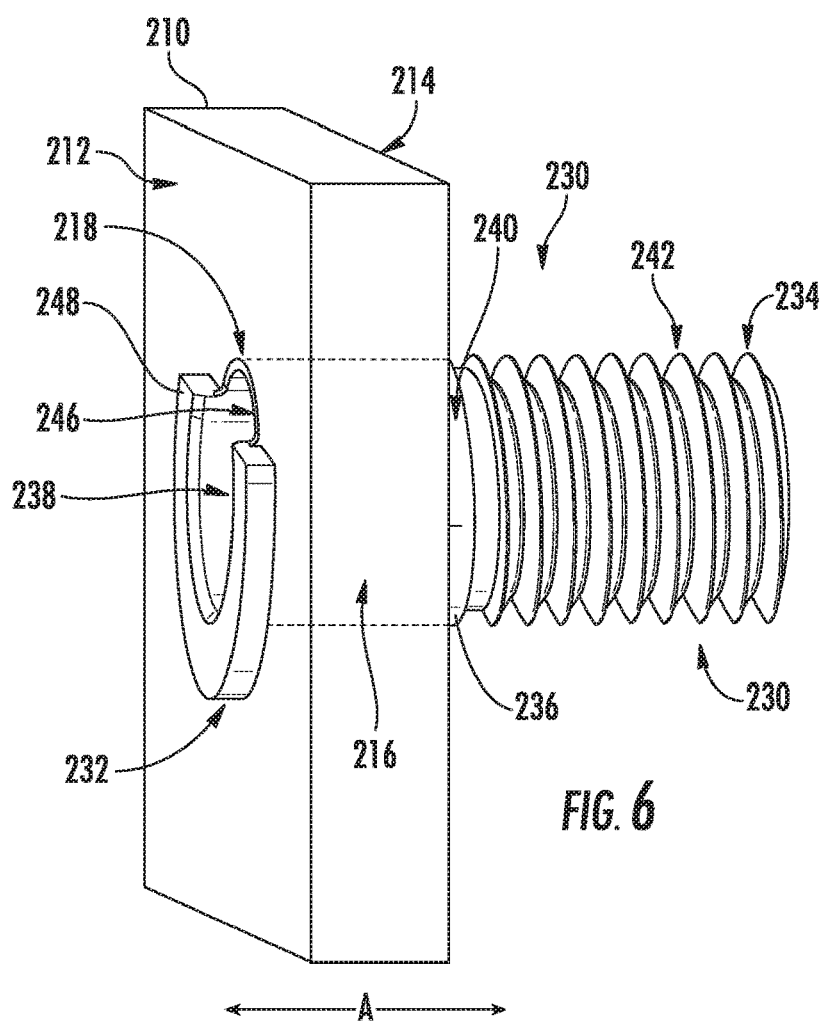
FIG. 6 provides a perspective view of the grommet mounted to a component of the interface assembly of FIG. 2.

Referring now to FIGS. 5 and 6, FIG. 6 provides a perspective view of the grommet 230 mounted to the component 210 of the interface assembly 200. As shown, the grommet 230 includes a flange 248 projecting from the body 236 at or proximate the first end 232. For this embodiment, the flange projects from the interface portion 240 of the body 236. The flange 248 projects radially outward from the body 236 and extends circumferentially around at least a portion of the hole 238. For this embodiment, the flange 148 extends circumferentially less than three hundred sixty degrees (360°) around the hole 238. As depicted, the flange 248 extends circumferentially around about two-thirds of the hole 238 and has a U-shape when viewed from the axial direction A. Thus, in some embodiments, the flange 248 extends circumferentially less than or equal to two thirds around the hole 238. Advantageously, as the flange 248 only extends partially around the hole 238 in this embodiment, other features or components may be positioned proximate or very near the grommet assembly 220 without being interrupted by the flange 248 of the grommet 230. Conversely, the flange 248 may be positioned without being interrupted by such features of components or surfaces. For instance, a chordal seal may be positioned proximate the grommet assembly 220 without interrupting the grommet 230 as the flange 248 does not extend entirely around or annularly about the hole 238. When the grommet 230 is mounted to the component 210, the flange 248 may be in direct contact with the first surface 212 of the component 210. In other embodiments, a spacer or other component may be positioned therebetween. For instance, a compliant spacer may be positioned between the flange 248 and the first surface 212 of the component 210. The spacer may be formed of a metallic or polymer material, for example.

Figure 7:
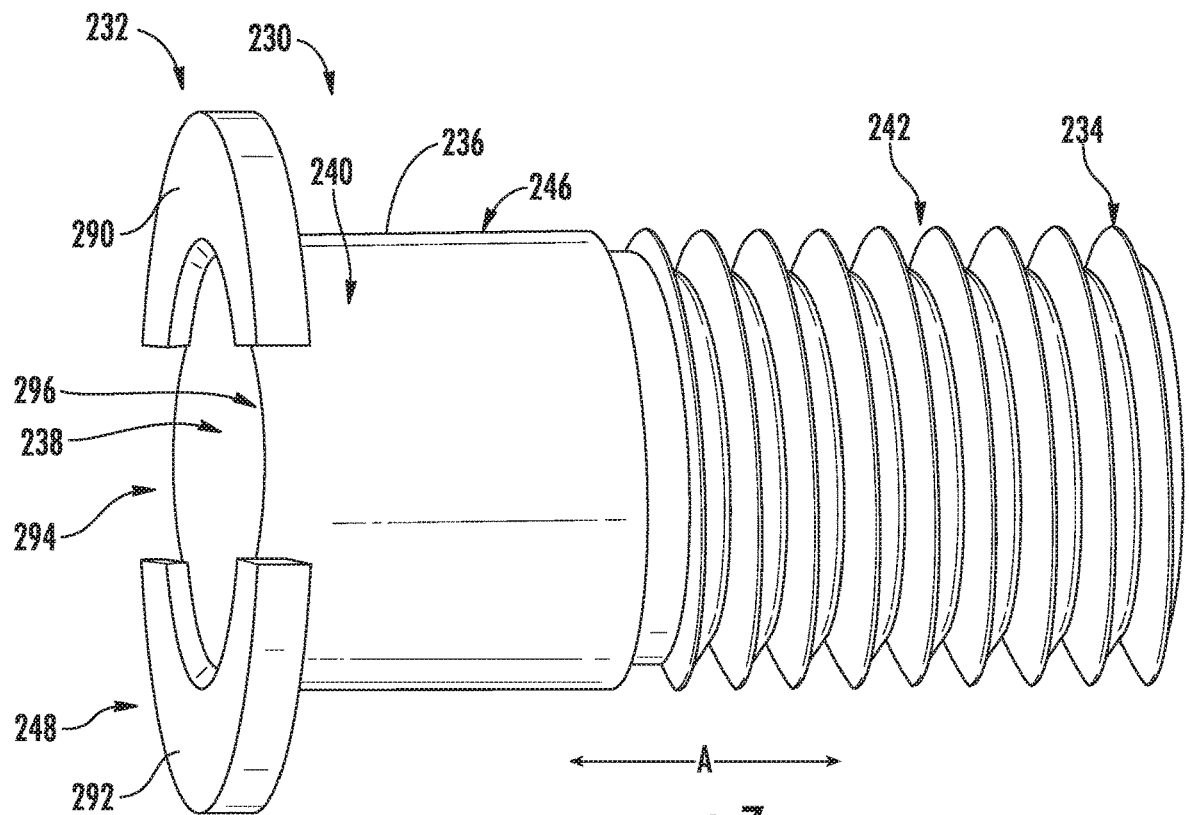
FIG. 7 provides a perspective view of another exemplary grommet that may be incorporated into the grommet assembly of FIG. 2.
Figure 8:
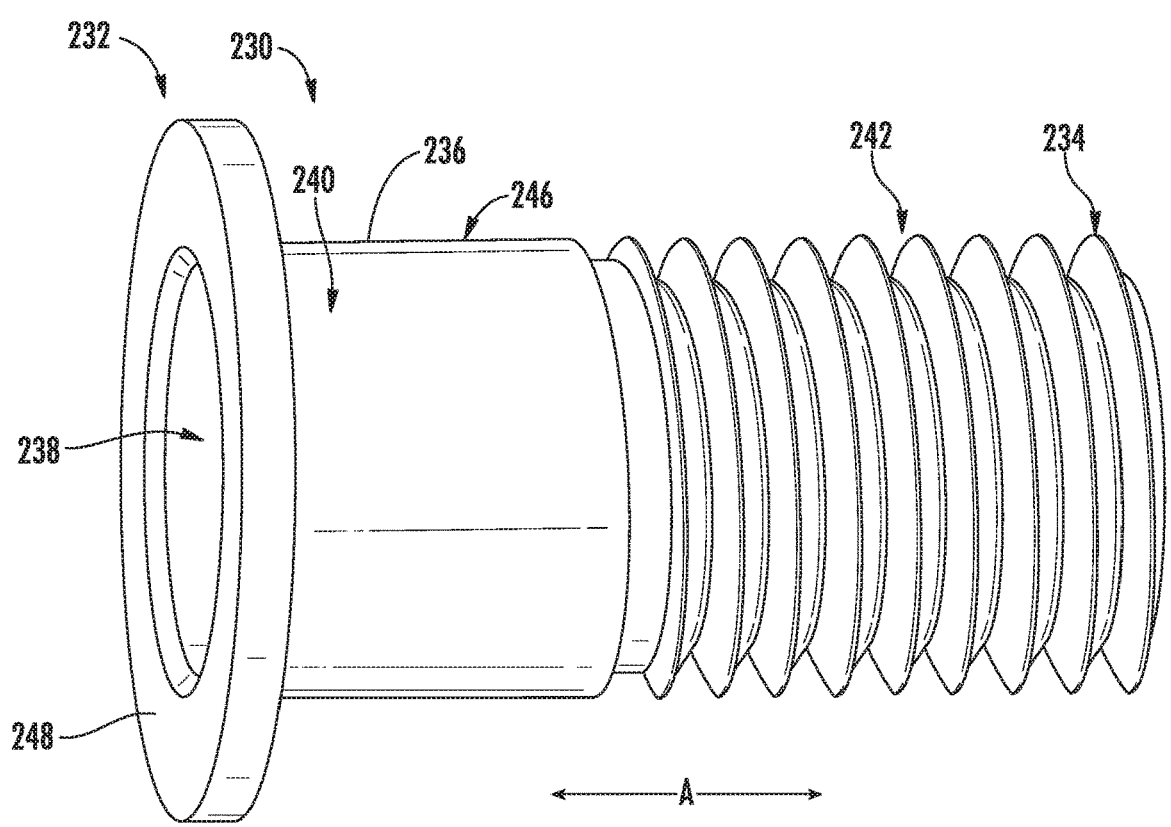
FIG. 8 provides a perspective view of yet another exemplary grommet that may be incorporated into the grommet assembly of FIG. 2.

As shown in FIG. 7, in some exemplary embodiments, the flange 248 may have multiple interruptions or spaces between portions of the flange 248. For example, as depicted in FIG. 7, the flange 248 includes a first flange portion 290 that extends circumferentially one third around the hole 238. The flange 248 also includes a second flange portion 292 that extends circumferentially one third around the hole 238. The first flange portion 290 is spaced from the second flange portion 292 by a first interruption 294 defined therebetween. Particularly, the first interruption 294 extends circumferentially by one sixth of the arc around the hole 238. The first flange portion 290 is also spaced from the second flange portion 292 by a second interruption 296 defined therebetween radially opposite of the first interruption 294. The second interruption 296 extends circumferentially by one sixth of the arc around the hole 238. Accordingly, other features or components may be positioned proximate or very near the grommet assembly 220, e.g., within or at the first and second interruptions 294, 296 without being interrupted by the flange 248 of the grommet 230. It will be appreciated that in other embodiments that the flange 248 may be include more than two portions and more than two interruptions or spaces between flange portions. In some alternative embodiments, as shown in FIG. 8, the flange 248 extends circumferentially around the hole 238. That is, the flange 248 may extend annularly around the hole 238 in some embodiments.

Returning to FIGS. 3, 4, and 5, as shown, the grommet assembly 220 of the interface assembly 200 also includes locking member 250. The locking member 250 is removably mounted or mountable to the body 236. For this embodiment, the locking member 250 is threaded onto the threaded portion 242 of the body 236. Thus, the locking member 250 has a thread or threaded portion that is complementary to the thread of the threaded portion 242. The locking member 250 may be any suitable threaded fastening device, such as e.g., a nut or a locking nut. For this embodiment, the locking member 250 is a locking nut. The locking member 250 may be formed of a metallic or polymer material, for example. As will be explained in further detail below, when the locking member 250 is threaded onto the threaded portion 242, the locking member 250 places the grommet 230 under tension, causing the flange 248 to apply a clamping force on the first surface 212 of the component 210. When the locking member 250 is fully threaded into position, the locking member 250 applies an opposing clamping force on the second surface 214. In this way, the locking member 250 and the flange 248 clamp the component 210 to secure the grommet 230 to the component 210.

In some embodiments, the locking member 250 includes a secondary retention feature 270. As shown best in FIGS. 3 and 4, the secondary retention feature 270 projects outward from the locking member 250 along the axial direction A and extends circumferentially around an opening defined by the locking member 250. For this embodiment, the secondary retention feature 270 is a plurality of castellations 272 spaced from one another, e.g., along the circumferential direction C. When the locking member 250 is mounted to the body 236, or more particularly, when the locking member 250 is threaded onto the threaded portion 242, the secondary retention feature 270 is crimped onto the body 236. More specifically, for this embodiment, the castellations 272 are crimped onto the threaded portion 242 of the grommet 230 to create a high friction interface therebetween. In the event the flange 248, the component 210, and/or the locking member 250 fail during operation of the turbofan 10 (FIG. 1) or the turbomachine in which the grommet assembly 220 is positioned, the secondary retention feature 270 provides a secondary means of retaining the locking member 250 on the grommet 230. In alternative exemplary embodiments, the secondary retention feature 270 can be another suitable type of retention feature. For example, in some embodiments, the secondary retention feature 270 may be lock wire operable to secure the locking member 250 and other components of grommet assembly 220. As another example, a cotter pin or other external locking features may be used to secure the locking member 250 and other components of grommet assembly 220.

The grommet assembly 220 of the interface assembly 200 further includes compliant member 260. In some embodiments, compliant member 260 is at least one of a bushing, a spring, and a damper. For this embodiment, the compliant member 260 is a bushing formed of a compliant material. For instance, the compliant member 260 may be formed of a compliant metal material that is less stiff than both the locking member 250 and the component 210. The compliant member 260 is removably mounted to the body 236 of the grommet 230. More particularly, the compliant member 260 may be mounted to the outer surface 246 of the interface portion 240. When mounted, the compliant member 260 extends circumferentially around at least a portion of the outer surface 246. For the depicted embodiment of FIGS. 2, 3, and 4, the compliant member 260 extends circumferentially less than three hundred sixty degrees (360°) around the outer surface 246. More specifically, the compliant member 260 extends circumferentially around about two-thirds of the hole 238 and has a U-shape when viewed from the axial direction A. Advantageously, as the compliant member 260 only extends partially around the outer surface 246 of the interface portion 240, other features or components may be positioned proximate or very near the grommet assembly 220 without being interrupted by the compliant member 260 of the grommet assembly 220. Conversely, the compliant member 260 may be positioned without being interrupted by such interrupting features. In some embodiments, however, the compliant member 260 extends circumferentially around the outer surface 246 of the interface portion 240. That is, the compliant member 260 may extend annularly around the outer surface 246 in some embodiments.

When the compliant member 260 is mounted to the body 236 of the grommet 230, the compliant member 260 is disposed between the locking member 250 and the second surface 214 of the component 210. In other embodiments, a spacer or other component may be positioned between the second surface 214 and the compliant member 260 and/or between the compliant member 260 and the locking member 250. As the compliant member 260 is formed of a compliant material as noted above, when the locking member 250 is fully threaded into position on the threaded portion 242, the compliant member 260 may be compressed between the component 210 and the locking member 250.

With general reference to FIGS. 2 through 6, the grommet assembly 220 may be mounted to the component 210 in the following exemplary manner. The grommet 230 is first passed through the pass-through opening 216 of the component 210. Particularly, the second end 234 of the grommet 230 is inserted and passed through the pass-through opening 216 of the component 210. The grommet 230 is moved in the axial direction A until the flange 248 contacts the first surface 212 of the component 210. Thus, the flange 248 acts as a stop during assembly. FIG. 6 depicts the grommet 230 fully inserted into position through the pass-through opening 216 of the component 210. When the grommet 230 is mounted to the component 210, the body 236 is received by the pass-through opening 216 of the component 210. More particularly, the interface portion 240 of the grommet 230 is received by the pass-through opening 216 of the component 210. The outer surface 246 of the interface portion 240 contacts and is in mating engagement with the interior surface 218 of the component 210.

Once the grommet 230 is mounted to the component 210, the locking member 250 is mounted to the body 236 of the grommet 230. More particularly, for this embodiment, locking member 250 is threaded onto the threaded portion 242 of the grommet 230. When the locking member 250 is threaded onto the threaded portion 242 of the body 236, the flange 248 is placed under tension against the first surface 212 of the component 210 and the locking member 250 applies an opposing force against the second surface 214 of the component 210 to clamp the grommet 230 to the component 210. Thus, the locking member 250 and the flange 248 clamp the component 210 to secure the grommet 230 to the component 210.

More particularly, as shown best in FIG. 3, when the locking member 250 is threaded onto the threaded portion 242 of the body 236, the torqueing of the locking member 250 on the threaded portion 242 places the grommet 230 under tension. This causes the flange 248 to apply a first force F1 on the first surface 212 of the component 210. The flange 248 may directly apply the first force F1 to the first surface 212 or may do some indirectly, e.g., if a spacer or other member is positioned between the flange 248 and the first surface 212. When the locking member 250 is fully threaded onto the threaded portion 242, the locking member 150 applies a second force F2 on the second surface 214 of the component 210 to clamp the grommet 230 to the component 210. The locking member 250 may directly apply the second force F2 to the second surface 214 or may do some indirectly, e.g., the locking member 250 may apply a force on the compliant member 260, which in turn may apply the force F2 on the second surface 214 of the component 210. The second force F2 opposes the first force F1 and the opposing forces F1, F2 create a clamping effect on the component 210. Accordingly, the locking member 250 and the flange 248 together secure the grommet 230 to the component 210. Advantageously, in embodiments in which the component 210 is a composite component formed of a plurality of plies, the clamping of the component 210 by the locking member 250 and the flange 248 creates an interlaminar compressive support for the plies proximate the joint or interface.

Further, the secondary retention feature 270 of the locking member 250 may further retain or secure the locking member 250 onto the grommet 230. For instance, the castellations 272 may be crimped down onto the threaded portion 242 of the grommet 230. Thus, in addition to the threaded engagement between the threads of the locking member 250 and the threads of the threaded portion 242 of the grommet 230, the locking member 250 may be further secured to the grommet 230 by the secondary retention feature 270. In some embodiments, as noted above, the secondary retention feature 270 may be other suitable external locking features, such as safety or lock wire or a cotter pin. In some exemplary embodiments, multiple secondary retention features 270 may be utilized, e.g., crimped castellations 272 and a cotter pin.

In some instances, it may be desirable to repair and/or replace one or more parts of the grommet assembly 220. Accordingly, the grommet assembly 220 may be removed from the component 210 in the following exemplary manner. First, if the locking member 250 includes a secondary retention feature 270, the secondary retention feature 270 is removed and/or manipulated so that the locking member 250 may be removed from the grommet 230. For instance, the crimped castellations 272 of the secondary retention feature 270 may be lifted up or bent back so that the locking member 250 may be removed from the grommet 230. After the secondary retention feature 270 is removed and/or manipulated so that the locking member 250 may be removed, the locking member 250 is in fact removed. Particularly, the locking member 250 is torqued such that the locking member 250 is removed from the threaded portion 242 of the body 236 of the grommet 230. Once the locking member 250 is removed from the grommet 230, the compliant member 260 is no longer placed under compression between the locking member 250 and the second surface 214 of the component, and consequently, the compliant member 260 may be removed from the grommet 230. Further, the flange 248 is no longer placed under tension when the locking member 250 is removed from the grommet 230, and therefore, the grommet 230 may be removed through the pass-through opening 216 of the component 210. In particular, the grommet 230 may be slid or moved along the axial direction A such that the threaded portion 242 is moved toward the first surface 212 of the component 210. Eventually, the threaded portion 242 of the grommet 230 is passed or slid through the pass-through opening 216 of the component 210. When this occurs, the grommet 230 is fully removed from the component 210. The parts of the grommet assembly 220 may then be inspected by an operator, and if any of the parts of the grommet assembly 220 need repaired or replaced, an operator may do so at a piece-part level. Moreover, the component 210 may be inspected and repaired as necessary. Notably, no machine tools, such as e.g., welding and/or brazing machines, are needed to remove the grommet assembly 220 from the component 210. Rather, a standard wrench may be used to remove the locking member 250 from the grommet 230. A pair of pliers or other suitable tools may be used to de-crimp the secondary retention feature 270 from the threaded portion 242 of the grommet 230 or used to remove a lock wire, a cotter pin, or any other readily removable secondary retention feature 270. Accordingly, disassembly of the grommet assembly 220 is less complex, requires only simple tools, and the component 210 is not affected when the grommet assembly 220 is removed therefrom.

The exemplary grommet assembly 220 described herein provides a number of advantages. For instance, as noted above, the grommet assembly 220 may mounted to and removed from the component 210 without need for machine tools, such as welding and brazing machines. The grommet assembly 220 may be mounted to or removed from the component 210 with a standard wrench, for example. Thus, the time, cost, and complexity of mounting and removing the grommet assembly 220 to and from the component 210 are reduced. In addition, the flange 248 of the grommet 230 need not extend circumferentially entirely around the hole 238. Thus, the grommet 230 of the present disclosure may be utilized proximate interrupting surfaces or components, such as e.g., chordal seals. Conventional swaged grommets require an annular flat surface for mounting to components.

Moreover, the grommet assembly 220 is removable and the parts of the grommet assembly 220 are replaceable at the piece-part level. Thus, parts of the grommet assembly 220 may be inspected after use, and if a particular part is in need of repair or needs replacing, that particular part may be repaired/replaced and utilized with the parts not in need of repair or replacement. The parts removed from the grommet assembly 220 may also be removed and thermally processed to return them to operable condition. For instance, the parts or components of the grommet assembly 220 may be subjected to an annealing process, thermal spray process, or a coating process. Conventional grommets that are welded or brazed into the component 210 do not include such advantages. Further, in embodiments in which the component is formed of a CMC material or some other composite material, the compression on the component 210 applied by the flange 248 and the locking member 250 near the pass-through opening 216 may provide an interlaminar compressive support for the plies proximate the pass-through opening 216. This may improve the composite component structurally near the pass-through opening 216. Moreover, the use of the grommet 230 for receiving interface members 280 greatly reduces or prevents delamination of the plies proximate the pass-through opening 216. A lubricious wear surface on both the interface member 280 and the component 210 may be created by the inner surface 244 and outer surface 246 of the grommet 230, respectively. Further, the material of the grommet 230 may be selected and tuned for improved temperature capability, friction coefficients, contact compliance between the grommet 230 and the interface member 280 received in the hole 238 of the grommet 230. The grommet assembly 220 of the present disclosure provides other advantages and benefits not specifically noted herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A grommet assembly, comprising:
  a grommet removably mounted to a component defining a pass-through opening, the grommet having a body extending between a first end and a second end and defining a hole, a flange projecting from the body at or proximate the first end and extending circumferentially around at least a portion of the hole; and
  a locking member removably mounted to the body;
  wherein when the grommet is mounted to the component and the locking member is mounted to the body, the body of the grommet is received within the pass-through opening of the component and the locking member is mounted to the body such that the locking member and the flange clamp the grommet to the component;
  wherein the flange extends circumferentially less than three hundred sixty degrees around the hole.

2. The grommet assembly of claim 1, wherein the body has an interface portion having a smooth outer surface and a threaded portion extending between the second end and the interface portion, wherein when the grommet is mounted to the component, the interface portion of the body is received within the pass-through opening of the component.

3. The grommet assembly of claim 2, wherein when the locking member is mounted to the body, the locking member is threaded onto the threaded portion.

4. The grommet assembly of claim 2, wherein the interface portion of the body has a smooth inner surface.

5. The grommet assembly of claim 1, wherein the locking member has a secondary retention feature, wherein when the locking member is mounted to the body, the secondary retention feature is crimped onto the body.

6. The grommet assembly of claim 1, further comprising:
  a compliant member removably mounted to the body, wherein the body has an outer surface and an inner surface, and wherein when the compliant member is mounted to the body, the compliant member is disposed around at least a portion of the outer surface of the body between the locking member and the component.

7. The grommet assembly of claim 6, wherein the compliant member is at least one of a bushing, a spring, and a damper.

8. The grommet assembly of claim 6, wherein the component has a first surface and a second surface spaced from the first surface, and wherein the pass-through opening extends between the first surface and the second surface, and wherein when the grommet and the compliant member are mounted to the body, the compliant member is disposed between the locking member and the second surface of the component and the flange contacts the first surface of the component.

9. The grommet assembly of claim 6, wherein the compliant member is formed of a compliant material, the compliant material having a stiffness that is less than a stiffness of the locking member and a stiffness of the component.

10. The grommet assembly of claim 1, wherein the flange has a first flange portion extending circumferentially less than three hundred sixty degrees around the hole and a second flange portion extending circumferentially less than three hundred sixty degrees around the hole and spaced from the first flange portion.

11. The grommet assembly of claim 1, wherein the hole of the body is configured to receive an interface member.

12. The grommet assembly of claim 1, wherein the grommet is formed of a metallic material.

13. The grommet assembly of claim 1, wherein the component is formed of a composite material.

14. The grommet assembly of claim 13, wherein the composite material is a ceramic matrix composite (CMC) material.

15. The grommet assembly of claim 1, wherein the grommet assembly defines an axial direction and the flange is located at a periphery of the grommet along the axial direction.

16. An interface assembly, comprising:
a component having a first surface and a second surface spaced from the first surface, the component defining a pass-through opening extending between the first surface and the second surface;
a grommet assembly, comprising:
a grommet having a body extending between a first end and a second end and defining a hole for receiving an interface member, the body having an interface portion and a threaded portion, the grommet further having a flange projecting from the interface portion of the body at or proximate the first end, the flange extending circumferentially less than three hundred sixty degrees around the hole; and
a locking member removably mounted to the threaded portion of the body.

17. The interface assembly of claim 16, wherein when the interface portion of the body is received within the pass-through opening of the component and the locking member is threaded onto the threaded portion of the body, the locking member and the flange clamp the grommet to the component.

18. The interface assembly of claim 16, further comprising:
a compliant member removably mounted to the interface portion of the body, wherein when the compliant member is mounted to the interface portion of the body, the compliant member extends circumferentially around at least a portion of the interface portion and is disposed between the locking member and the second surface of the component.

19. The interface assembly of claim 16, wherein the locking member has a secondary retention feature, wherein when the locking member is threaded onto the threaded portion of the body, the secondary retention feature is crimped onto the threaded portion.

20. An interface assembly, comprising:
a component formed of a ceramic matrix composite (CMC) material and having a first surface and a second surface spaced from the first surface, the component defining a pass-through opening extending between the first surface and the second surface;
an interface member formed of a metallic material; and
a grommet assembly, comprising:
a grommet formed of a metallic material and having a body extending between a first end and a second end, the body having an interface portion defining a hole for receiving the interface member, the body also having a threaded portion extending from the second end to the interface portion, the grommet further having a flange projecting radially from the interface portion of the body at or proximate the first end, the flange extending circumferentially less than three hundred sixty degrees around the hole; and
a locking member removably mounted to the threaded portion of the body;
wherein when the interface portion of the body is received within the pass-through opening of the component and the locking member is threaded onto the threaded portion of the body, the locking member and the flange clamp the grommet to the component.

* * * * *